United States Patent Office 2,739,951
Patented Mar. 27, 1956

2,739,951

MANUFACTURE OF ASPHALT

Clarence E. Wilkinson, Port Neches, Tex., assignor to The Texas Company, New York, N. Y., a corporation of Delaware No Drawing. Application April 15, 1952,
Serial No. 282,467

4 Claims. (Cl. 260—28)

This invention is concerned with modifying the character of asphalt products obtained from crude petroleum residua and contemplates incorporating certain phenol-formeldehyde resins in the residua and air blowing the mixture.

In accordance with the invention it is found that by adding certain phenol-formaldehyde resins to the crude petroleum residua prior to air blowing that the character of the asphalt product is very materially altered, the modification being generally in the direction of increased temperature susceptibilities and reduction in the oil exudation property of the product.

The resins which are useful in the practice of the invention in accomplishing these modifications in the nature of the asphalt product include the phenol-formaldehyde resins which are dispersible or compatible with crude petroleum residua and which have relatively low melting or softening points, generally under 300° F. ring and ball. The preferred resins are the so-called unmodified or 100% phenol-formaldehyde resins. These resins are termed unmodified because they are prepared without the addition of natural resins such as rosin. These unmodified or 100% phenol-formaldehyde resins are prepared with the aid of either alkaline or acidic catalysts from certain substituted phenols, such as xylenols, p-phenylphenol, tert-butyl-tert-amylphenols and sec-octyl phenols. They are characterized by being soluble in all proportions in ether, acetone, ethyl acetate, ethylene dichloride, turpentine, aromatic hydrocarbons boiling from 95–215° C., and partly soluble in ethyl alcohol. They are readily dispersible in petroleum residua particularly at temperatures above their melting points. The specific gravity runs about 1.04, the acid numbers are not over 30–40, and the melting or softening points (ring and ball) are relatively low, such as about 170–230° F. These resins are usually amber colored and are well represented by certain of the "Amberol" resins marketed by Rohm and Haas Company, such as "Amberol ST-137" and "Amberol ST*137X." Although the preferred form of the invention contemplates the use of the unmodified or 100% phenol-formaldehyde resins, the rosin modified phenol-formaldehyde resins may also be employed in the practice of the invention provided that such resins have melting or softening points under 300° F. ring and ball and provided that they are readily dispersible or compatible with crude petroleum residua. These modified resins are produced from phenol, cresols, and their homologs, with formaldehyde and natural resins, especially rosin, to form a chemical combination of phenol-formaldehyde and the natural resin acid. The solubilities of the modified resins are generally similar to those of the unmodified resins, although the modified resins are generally not soluble in alcohol and some of them are not soluble in acetone.

The invention is of particular importance in the production of asphalt products of reduced oil exudation properties. Asphalt is considered to be a colloidal system in which the asphaltenes are dispersed. By air blowing the mixture of petroleum residuum and phenol-formaldehyde resin an asphalt product of increased stability as regards the retention of oily materials is obtained. The stain test, used for measuring this oil exudation property of asphalts, is described in the following references: Determination of the stain number of asphalts, by H. E. Schweyer and H. C. Howell, Ind. Eng. Chem., Anal. Ed., vol. 9, 563 (1937); Oil exudation property of asphalts by E. C. Knowles, F. C. McCoy, H. E. Schweyer and C. E. Wilkinson, Ind. Eng. Chem., vol. 42, 2340 (1950). The practice of the invention makes possible the production from a given petroleum source of asphalts of lower stain indices than can be produced by air blowing without the presence of the resin. The presence of the resin in the oxidizing reactions appears to have the tendency of making the colloid product of less gel character and more of the sol type.

A particular field of usefulness for the invention resides in the preparation of asphalts, by air blowing paraffinic or paraffinic-asphaltic residua of crude petroleum admixed with the phenol-formaldehyde additive, of a character such as are prepared by the air blowing of asphaltic or asphaltic-cyclic residua of crude petroleum. The residua from paraffinic and paraffinic-asphaltic crudes are characterized by high paraffinic contents, low densities and high solubilities in n-pentane. Crudes of this type are represented by many of the Gulf Coast and Mid-Continent crudes. It is not normally possible to prepare from such residua by air blowing the types of coating and paving asphalts that can be prepared by air blowing an asphaltic or asphaltic-cyclic residuum. In accordance with the invention, however, by incorporating the phenol-formaldehyde resins described in the paraffinic or the paraffinic-asphaltic residuum and air blowing the mixture, asphalts having increased temperature susceptibilities and lower stain indices suitable for coating and paving asphalts may be prepared.

The amount of the phenol-formaldehyde resin that is added to the petroleum residuum depends on the extent of modification desired but usually about 5–10% by weight is sufficient to give very material improvement in the stain index and in increased temperature susceptibility. For example, with 10% of the resin in a paraffinic or paraffinic-asphaltic residuum a type of asphalt can be made such as previously could be made only from an asphaltic or asphaltic-cyclic residuum. The asphalts made by air blowing a paraffinic or paraffinic-asphaltic residuum are of very pronounced gel character, and accordingly have much higher stain indices, than the asphalts made by air blowing an asphaltic or asphaltic-cyclic residuum. The addition of the phenol-formaldehyde resin has the property of modifying the gel character of the asphalt product and reducing the stain index of the asphalt product obtained by air blowing the paraffinic or paraffinic-asphaltic residuum.

In air blowing the mixture of crude residuum and phenol-formaldehyde resin the usual temperatures normally applied in the manufacture of asphalt are used such as about 475–525° F. The presence of this resin appears to have the tendency to reduce the blowing time required. For example, in blowing a residuum to 220° F. ring and ball softening point required a blowing time of 22 hours, the time required to obtain the same softening point, using additions of some 5–10% of the resin, is reduced to about 17–19 hours.

The following table shows typical results obtained in the treatment of a paraffinic crude residuum in accordance with the invention to obtain a coating asphalt product of a type normally produced by air blowing an asphaltic-cyclic crude residuum.

|  | 1 | 2 | 3 | 4 | 5 |
|---|---|---|---|---|---|
| Paraffinic Crude Residuum__percent__ | 100 | 98 | 95 | 90 | ------ |
| Unmodified Phenol-Formaldehyde Resin_____percent__ | ------ | 2 | 5 | 10 | ------ |
| Asphaltic-Cyclic Crude Residuum percent__ | ------ | ------ | ------ | ------ | 100 |
| Viscosity of charge, S. F. at 210° F____ | 135 | 134 | 186 | 183 | ------ |
| Asphalt Product: | | | | | |
| Softening Point— Ring and Ball_____ | 223 | 218 | 216 | 212 | 212 |
| Ductility at 77° F_____ | 1.75 | 2.0 | 2.25 | 1.25 | 2.0 |
| Penetration— | | | | | |
| at 32° F_____ | 12 | 12 | 9 | 8 | 6 |
| at 77° F_____ | 20 | 17 | 15 | 12 | 10 |
| at 115° F_____ | 32 | 27 | 23 | 20 | 22 |
| Stain Index_____ | 21 | 15 | 16 | 10 | 10 |

The table shows the results obtained by air blowing a paraffinic crude residuum without the additive and with 2%, 5% and 10% by weight of an unmodified phenol-formaldehyde resin, Amberol ST-137. The table shows the viscosity of the several charging stocks to the converter wherein the straight crude residuum and the residuum containing the different proportions of the resin were air blown to produce the several asphalt products and gives the tests on the finished asphalt products. Column 5 of the table gives the tests on an asphalt made by air blowing an asphaltic cyclic crude residuum without any additive. The figures show the effect of adding increased amounts of the unmodified phenol-formaldehyde resins in making products more like those obtained by the mere air blowing of an asphaltic-cyclic crude residuum and indicate that with 10% added resin the product very closely resembles the product obtained from the asphaltic-cyclic residuum.

Although a preferred embodiment of the invention has been described herein, it will be understood that various changes and modifications may be made therein, while securing to a greater or less extent some or all of the benefits of the invention, without departing from the spirit and scope thereof.

I claim:

1. In the manufacture of asphalt, the process that comprises adding to a petroleum residuum a phenol-formaldehyde resin having a ring and ball softening point below 300° F and which is dispersible in said residuum at temperatures above its melting point and air blowing the mixture at reactive temperatures to effect conversion to an asphalt product of improved stain index.

2. In the manufacture of asphalt, the process that comprises adding to a petroleum residuum an unmodified phenol-formaldehyde resin dispersible in said residuum at temperatures above its melting point and air blowing the mixture at reactive temperatures to effect conversion to an asphalt product of improved stain index.

3. The process according to claim 2 in which said unmodified phenol-formaldehyde resin has a ring and ball softening point within a range of about 170–230° F.

4. In the manufacture of asphalt, the process that comprises adding to a petroleum residuum selected from the group consisting of paraffinic and paraffinic-asphaltic petroleum residua an unmodified phenol-formaldehyde resin dispersible in the residuum at temperatures above its melting point and air blowing the mixture at reactive temperatures to effect conversion to an asphalt product having characteristics of an asphalt produced by air blowing, in the absence of such phenol-formaldehyde resin, petroleum residuum selected from the group consisting of asphaltic and asphaltic-cyclic petroleum residua.

References Cited in the file of this patent

UNITED STATES PATENTS

| 2,046,318 | Brubaker | July 7, 1936 |
| 2,095,190 | Heuscher | Oct. 5, 1937 |
| 2,165,380 | Honel | July 11, 1939 |